US010929382B1

(12) United States Patent
Subramanian et al.

(10) Patent No.: US 10,929,382 B1
(45) Date of Patent: Feb. 23, 2021

(54) METHOD AND SYSTEM TO VERIFY INTEGRITY OF A PORTION OF REPLICATED DATA

(71) Applicant: EMC IP Holding Company LLC, Hopkinton, MA (US)

(72) Inventors: Krithika Subramanian, Bangalore (IN); Srisailendra Yallapragada, Cupertino, CA (US); Harshadrai Parekh, San Jose, CA (US); Bhimsen Bhanjois, Fremont, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 86 days.

(21) Appl. No.: 15/664,859

(22) Filed: Jul. 31, 2017

(51) Int. Cl.
G06F 16/23 (2019.01)
G06F 16/27 (2019.01)

(52) U.S. Cl.
CPC .......... G06F 16/2365 (2019.01); G06F 16/27 (2019.01)

(58) Field of Classification Search
CPC ............... G06F 16/2365; G06F 16/27
See application file for complete search history.

(56) References Cited

U.S. PATENT DOCUMENTS

| | | | |
|---|---|---|---|
| 7,085,911 B2 | 8/2006 | Sachedina et al. | |
| 7,818,515 B1 | 10/2010 | Umbehocker et al. | |
| 8,046,551 B1 | 10/2011 | Sahin | |
| 8,190,835 B1 | 5/2012 | Yueh | |
| 8,204,868 B1 | 6/2012 | Wu et al. | |
| 8,396,841 B1 | 3/2013 | Janakiraman | |
| 8,732,403 B1 | 5/2014 | Nayak | |
| 8,782,323 B2 | 7/2014 | Glikson et al. | |
| 8,898,114 B1 | 11/2014 | Feathergill et al. | |
| 8,898,120 B1 | 11/2014 | Efstathopoulos | |
| 8,904,120 B1 * | 12/2014 | Killamsetti | G06F 13/00 711/156 |
| 8,918,390 B1 | 12/2014 | Shilane et al. | |
| 8,943,032 B1 | 1/2015 | Xu et al. | |
| 8,949,208 B1 | 2/2015 | Xu et al. | |

(Continued)

FOREIGN PATENT DOCUMENTS

| | | |
|---|---|---|
| EP | 2738665 A1 | 6/2014 |
| WO | 2013056220 A1 | 4/2013 |

(Continued)

OTHER PUBLICATIONS

Aseem Kishore, "What is a Checksum and How to Calculate a Checksum", Retrieved from the Internet: https://www.online-tech-tips.com/cool-websites/what-is-checksum/, Feb. 18, 2015. (Year: 2015).*

(Continued)

Primary Examiner — Robert W Beausoliel, Jr.
Assistant Examiner — Mohammad Solaiman Bhuyan
(74) Attorney, Agent, or Firm — Chamberlin, Hrdlicka, White, Williams, & Aughtry

(57) ABSTRACT

In general, embodiments of the invention relate to methods and systems for replicating data, which is stored in a source system, in a target system. More specifically, embodiments of the invention enable parallel transmission and verification of portions of the data. Once the portions of the data have been verified, embodiments of the invention combine the verified portions of the data to obtain the final combined data. The combined data is then verified.

12 Claims, 11 Drawing Sheets

(56) References Cited

U.S. PATENT DOCUMENTS

| | | | |
|---|---|---|---|
| 9,183,200 B1 | 11/2015 | Liu et al. | |
| 9,244,623 B1 | 1/2016 | Bent et al. | |
| 9,250,823 B1 | 2/2016 | Kamat et al. | |
| 9,251,160 B1* | 2/2016 | Wartnick | H04L 67/10 |
| 9,274,954 B1 | 3/2016 | Bairavasundaram et al. | |
| 9,280,550 B1 | 3/2016 | Hsu et al. | |
| 9,298,724 B1 | 3/2016 | Patil et al. | |
| 9,317,218 B1 | 4/2016 | Botelho et al. | |
| 9,336,143 B1 | 5/2016 | Wallace et al. | |
| 9,390,116 B1 | 7/2016 | Li et al. | |
| 9,390,281 B2 | 7/2016 | Whaley et al. | |
| 9,424,185 B1 | 8/2016 | Botelho et al. | |
| 9,442,671 B1 | 9/2016 | Zhang et al. | |
| 9,830,111 B1 | 11/2017 | Patiejunas et al. | |
| 10,002,048 B2 | 6/2018 | Chennamsetty et al. | |
| 10,031,672 B2 | 7/2018 | Wang et al. | |
| 10,078,451 B1 | 9/2018 | Floyd et al. | |
| 10,102,150 B1 | 10/2018 | Visvanathan et al. | |
| 10,175,894 B1 | 1/2019 | Visvanathan et al. | |
| 10,445,292 B1 | 10/2019 | Zhang et al. | |
| 2003/0110263 A1 | 6/2003 | Shillo | |
| 2005/0120058 A1 | 6/2005 | Nishio | |
| 2005/0160225 A1 | 7/2005 | Presler-Marshall | |
| 2005/0182906 A1 | 8/2005 | Chatterjee et al. | |
| 2006/0075191 A1 | 4/2006 | Lolayekar et al. | |
| 2008/0082727 A1 | 4/2008 | Wang | |
| 2008/0133446 A1 | 6/2008 | Dubnicki et al. | |
| 2008/0133561 A1 | 6/2008 | Dubnicki et al. | |
| 2008/0216086 A1 | 9/2008 | Tanaka et al. | |
| 2008/0244204 A1 | 10/2008 | Cremelie et al. | |
| 2009/0235115 A1 | 9/2009 | Butlin | |
| 2009/0271454 A1* | 10/2009 | Anglin | G06F 16/2365 |
| 2010/0049735 A1 | 2/2010 | Hou | |
| 2010/0094817 A1 | 4/2010 | Ben-Shaul et al. | |
| 2010/0250858 A1 | 9/2010 | Cremelie et al. | |
| 2011/0055471 A1 | 3/2011 | Thatcher et al. | |
| 2011/0099200 A1 | 4/2011 | Blount et al. | |
| 2011/0099351 A1 | 4/2011 | Condict | |
| 2011/0161557 A1 | 6/2011 | Haines et al. | |
| 2011/0185149 A1 | 7/2011 | Gruhl et al. | |
| 2011/0196869 A1 | 8/2011 | Patterson et al. | |
| 2011/0231594 A1 | 9/2011 | Sugimoto et al. | |
| 2011/0276781 A1 | 11/2011 | Sengupta et al. | |
| 2012/0158670 A1* | 6/2012 | Sharma | G06F 3/0608 707/692 |
| 2012/0209873 A1 | 8/2012 | He | |
| 2012/0278511 A1 | 11/2012 | Alatorre et al. | |
| 2013/0036098 A1* | 2/2013 | Mutalik | G06F 16/273 707/690 |
| 2013/0055018 A1 | 2/2013 | Joshi et al. | |
| 2013/0060739 A1 | 3/2013 | Kalach et al. | |
| 2013/0111262 A1 | 5/2013 | Taylor et al. | |
| 2013/0138620 A1 | 5/2013 | Yakushev et al. | |
| 2014/0012822 A1 | 1/2014 | Sachedina et al. | |
| 2014/0040205 A1 | 2/2014 | Cometto et al. | |
| 2014/0047181 A1 | 2/2014 | Peterson et al. | |
| 2014/0258248 A1 | 9/2014 | Lambright et al. | |
| 2014/0258824 A1 | 9/2014 | Khosla et al. | |
| 2014/0281215 A1 | 9/2014 | Chen et al. | |
| 2014/0310476 A1 | 10/2014 | Kruus | |
| 2015/0074679 A1 | 3/2015 | Fenoglio et al. | |
| 2015/0106345 A1 | 4/2015 | Trimble | |
| 2015/0178171 A1 | 6/2015 | Bish et al. | |
| 2015/0331622 A1 | 11/2015 | Chiu et al. | |
| 2016/0026652 A1* | 1/2016 | Zheng | G06F 16/1752 707/692 |
| 2016/0112475 A1 | 4/2016 | Lawson et al. | |
| 2016/0188589 A1 | 6/2016 | Guilford et al. | |
| 2016/0224274 A1 | 8/2016 | Kato | |
| 2016/0239222 A1 | 8/2016 | Shetty et al. | |
| 2016/0323367 A1 | 11/2016 | Murtha et al. | |
| 2016/0342338 A1 | 11/2016 | Wang | |
| 2017/0093961 A1 | 3/2017 | Pacella et al. | |
| 2017/0199894 A1 | 7/2017 | Aronovich et al. | |
| 2017/0220281 A1 | 8/2017 | Gupta et al. | |
| 2017/0220334 A1 | 8/2017 | Hart et al. | |
| 2017/0300424 A1 | 10/2017 | Beaverson et al. | |
| 2017/0352038 A1 | 12/2017 | Parekh et al. | |
| 2017/0359411 A1 | 12/2017 | Burns et al. | |
| 2018/0089037 A1 | 3/2018 | Liu et al. | |
| 2018/0146068 A1 | 5/2018 | Johnston et al. | |
| 2018/0322062 A1 | 11/2018 | Watkins et al. | |

FOREIGN PATENT DOCUMENTS

| | | |
|---|---|---|
| WO | 2013115822 A1 | 8/2013 |
| WO | 2014185918 A1 | 11/2014 |

OTHER PUBLICATIONS

International Search Report and Written Opinion issued in corresponding WO application No. PCT/US2018/027642, dated Jun. 7, 2018 (15 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

Deepavali Bhagwat et al.; "Extreme Binning: Scalable, Parallel Deduplication for Chunk-based File Backup"; IEEE Mascots; Sep. 2009 (10 pages).

Mark Lillibridge et al.; "Sparse Indexing: Large Scale, Inline Deduplication Using Sampling and Locality"; 7th USENIX Conference on File and Storage Technologies, USENIX Association; pp. 111-pp. 123; 2009 (13 pages).

International Search Report and Written Opinion issued in corresponding PCT Application PCT/US2018/027646, dated Jul. 27, 2018. (30 pages).

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

* cited by examiner

METHOD AND SYSTEM TO VERIFY INTEGRITY OF A PORTION OF REPLICATED DATA

BACKGROUND

Computing devices generate, use, and store data. The data may be, for example, images, document, webpages, or meta-data associated with any of the files. The data may be stored in persistent storage. In addition, to protect the aforementioned data, the data may be replicated to another persistent storage.

DETAILED DESCRIPTION

Figure 1A:
FIG. 1A shows a diagram of a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-7G, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for replicating data, which is stored in a source system, in a target system. More specifically, embodiments of the invention enable parallel transmission and verification of portions of the data. Once the portions of the data have been verified, embodiments of the invention combine the verified portions of the data to obtain the final combined data. The combined data is then verified. In this manner, individual portions of the data may be transferred in parallel, which results in a more efficient transfer of data between the source system and the target system. In addition, if there are errors in the transfer of the data, the errors may be more rapidly identified as the errors may be discovered once only a portion of the data has been transferred instead of after the entire set of data has been transferred. Additional details about embodiments of the invention are provided below, e.g., in FIGS. 4-7G.

In one embodiment of the invention, the systems described herein may include functionality to deduplicate the data before storing the data in the persistent storage. Deduplicating the data, before storing the data in the persistent storage, may decrease the amount of data that needs to be stored in the persistent storage when compared to the amount of data that can be stored in the persistent storage without deduplicating the data. Deduplicating the data may also decrease the cost associated with storing data in the persistent storage by reducing the total amount of storage required to store the deduplicated data when compared to the amount of storage required to store the data without being deduplicated.

As used herein, deduplication refers to methods of storing only portions of data that are not already stored in the persistent storage. For example, when multiple versions of a large text document, having only minimal differences between each of the versions, are stored without deduplication, storing each version will require approximately the same amount of storage space of a persistent storage. In contrast, when the multiple versions of the large text document are stored with deduplication, only the first version of the multiple versions stored will require a substantial amount of storage. Once the first version is stored in persistent storage, the versions of the large word document subsequently stored will be deduplicated before being stored in the persistent storage resulting in much less storage space of the persistent storage being required to store the subsequently stored versions when compared to the amount of storage space of the persistent storage required to store the first stored version. In one or more embodiments of the invention, additional detail about deduplication is provided below, e.g., in FIGS. 1A-3C.

FIG. 1A shows a diagram of a system in accordance with one or more embodiments of the invention. More specifically, the system includes a source system (101) and a target system (103). The source system (101) includes the data to be replicated (e.g., data that is currently storing the data) and includes functionality to store the data as shown in FIGS. 3A-3C and to perform that data transmission and verification as described in FIG. 4. An example of the source system is shown in FIGS. 1B-2B.

In one or more embodiments of the invention, the target system (103) includes a processor(s) (not shown), memory (not shown), and persistent storage (not shown). The target system includes functionality to perform the method shown in FIGS. 5-6. In addition, the target system may also include functionality to process requests from clients and to store data in the same (or substantially the same manner as the source system, see e.g., FIG. 1B).

In one or more embodiments of the invention, the source system and the target system are operatively connected using any combination of wireless and/or wired connections and any communication protocol(s).

Figure 1B:
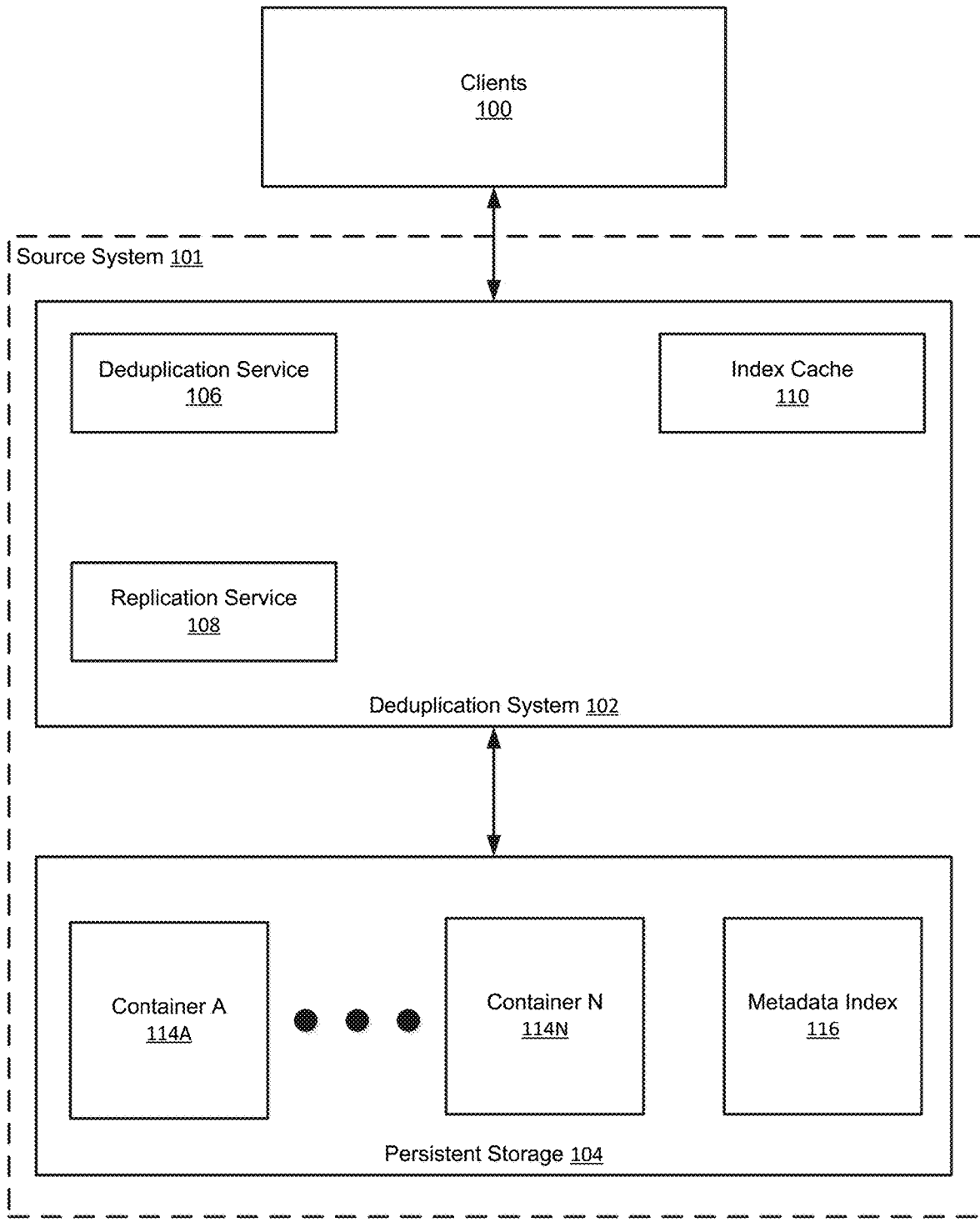
FIG. 1B shows a diagram of a source system in accordance with one or more embodiments of the invention.

FIG. 1B shows a diagram of a source system (101) in accordance with one or more embodiments of the invention. As shown in FIG. 1B, the source system includes a deduplication system (102), and persistent storage (104). Further, the source system (101) may interact with one or more clients (100). Each of these components is described below.

In one or more embodiments of the invention, a client (100) is any system or process executing on a system that includes functionality to issue a request to write data to the deduplication system (102) and/or issue a read request to the deduplication system (102). In one or more embodiments of the invention, the clients (100) may each include a processor(s) (not shown), memory (not shown), and persistent storage (not shown). The clients may include other components without departing from the invention.

In one or more embodiments of the invention, a client (100) is operatively connected to the deduplication system (102) using any combination of wireless and/or wired connections and any communication protocol(s).

In one or more embodiments of the invention, the deduplication system (102) includes a processor(s) (not shown), memory (not shown), and persistent storage (not shown). The deduplication system may include other components without departing from the invention. The deduplication system includes a deduplication service (106), a replication service (108) and an index cache (110). Each of these components is described below.

The deduplication service (106) includes functionality to deduplicate data prior to the data being written to the persistent storage. In one embodiment of the invention, the deduplication service writes data to the persistent storage in the manner described below in FIGS. 1B-3C.

The index cache (110) includes a set of entries, where each entry in the index cache includes a mapping between a fingerprint (i.e., a fingerprint for segment (described below)) and a container identifier (ID) (i.e., the container ID of the container in which the segment associated with the fingerprint is stored). The fingerprint of segment may be a bit sequence that identifies the segment.

More specifically, the fingerprint may include at least the following two components: (i) a hash component and (ii) a checksum component. The hash component includes a hash value generated by applying a hash function (described below) to the segment (i.e., to the content of the segment). The hash value may be generated using Rabin's fingerprinting algorithm, a cryptographic hash function, or any other fingerprinting algorithm without departing from the invention. The cryptographic hash function may be, e.g., a message digest (MD) algorithm or a secure hash algorithm (SHA). The message MD algorithm may be, e.g., MD5. The SHA may be, e.g., SHA-0, SHA-1, SHA-2, or SHA3. Other algorithms may be used without departing from the invention.

Continuing with the discussion of FIG. 1B, the checksum component includes a checksum value which corresponds to a checksum generating using of all data directly referenced by the segment or a checksum generated using checksum values in segments referenced by the segment. For example, referring to FIG. 7A, the checksum value in the fingerprint for segment $L1_A$ is the checksum of $\{A, B\}$. Further, the checksum value in the fingerprint for segment $L2_A$ is the checksum of the $\{$checksum $\{A, B\}$, checksum $\{C, D\}\}$.

The checksum value may be generated using, for example, an XOR function, or any other checksum function without departing from the invention.

Continuing with the discussion of FIG. 1B, the index cache may be used to determine a location of a particular segment when the deduplication service is servicing a read request for a client. In one embodiment of the invention, the index cache (110) may be updated by the deduplication service (106) as new segments are written to the persistent storage.

In one or more embodiments of the invention, the persistent storage (104) may include, but is not limited to, optical storage, magnetic storage, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

In one embodiment of the invention, the persistent storage includes a metadata index (116) and one or more containers (112A, 114N). The metadata index (116) includes a set of entries, where each entry in the metadata index includes a mapping between a fingerprint (i.e., a fingerprint for segment) and a container identifier (ID) (i.e., the container ID of the container in which the segment associated with the fingerprint is stored). The metadata index typically stores all of the fingerprint to container ID mappings for all containers in the persistent storage while the index cache may store only a subset of the aforementioned entries (e.g., the most recently used entries). The metadata index may store additional information without departing from the invention.

Continuing with the discussion of FIG. 1B, in one embodiment of the invention, data from the clients is stored in the persistent storage using a combination of data segments (also referred to as L0 segments) and metadata segments (also referred to as LP segments). The data segments are generated by dividing the data received from the client into smaller units. For example, if the client transmitted an 8 Mb file to store in the persistent storage, the deduplication service may first divide the 8 Mb file into 1024 data segments, each with an average of 8 Kb of data. The deduplication service may then generate a fingerprint for each of the generated data segments. These fingerprints are subsequently stored in the persistent storage in one or more metadata segments. For example, if each metadata segment can only store 512 fingerprints, then two metadata segments (each with 512 fingerprints) are created by the deduplication service. The metadata segments that include fingerprints of the data segments may be referred to as L1 metadata segments and/or first-level metadata segments.

Depending on the implementation of the deduplication service, the deduplication service may generate additional higher-level metadata segments. Continuing with the above example, the deduplication service may generate an L2 segment that includes fingerprints of one or more L1 metadata segments. The number of levels of metadata segments may vary based on the implementation of the deduplication service. The metadata segments may be collectively referred to as LP segments.

The data segments and metadata segments generated by the deduplication service are stored in containers in the persistent storage. Each container may only store data segments or metadata segments. For example, a first container in the persistent storage may only include data segments. However, the data segments may by be associated with different files (i.e., different files that the client has sent to the deduplication system for storage). With respect to containers storing metadata segments, a container that stores metadata segments may include different types of metadata segments (e.g., L1 metadata segment, L2 segments, etc.).

An example of how files are stored in the persistent storage is provided below with respect to FIGS. 3A-C.

Figure 2A:
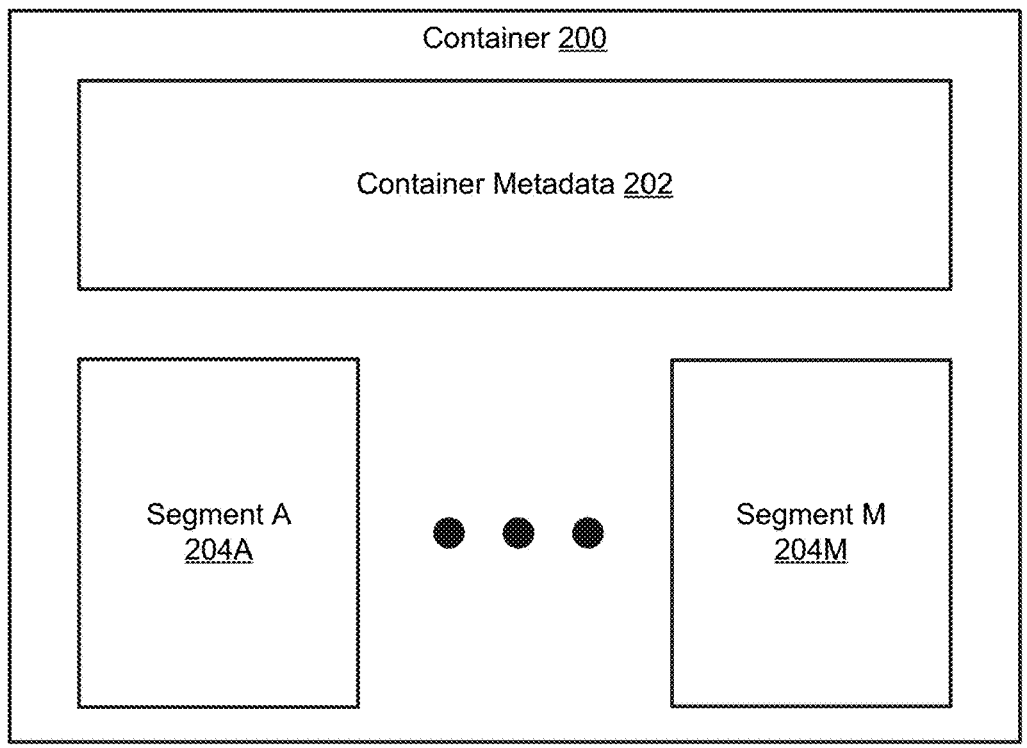
FIG. 2A shows a diagram of a container in accordance with one or more embodiments of the invention.

FIG. 2A shows a diagram of a container in accordance with one or more embodiments of the invention. As shown in FIG. 2A, each container (200) includes container metadata (202) and one or more segments (204A, 204M). Depending on the types of segments stored in the container, the segments may be data segments or metadata segments. The persistent storage may include any number of containers. The specific number of containers depends on the size of each container and the size of the persistent storage. Additional detail about the container metadata (202) is provided in FIG. 2B. Further, the size of the segments (204A, 204M) stored in the containers may vary based on the implementation of the invention.

Figure 2B:
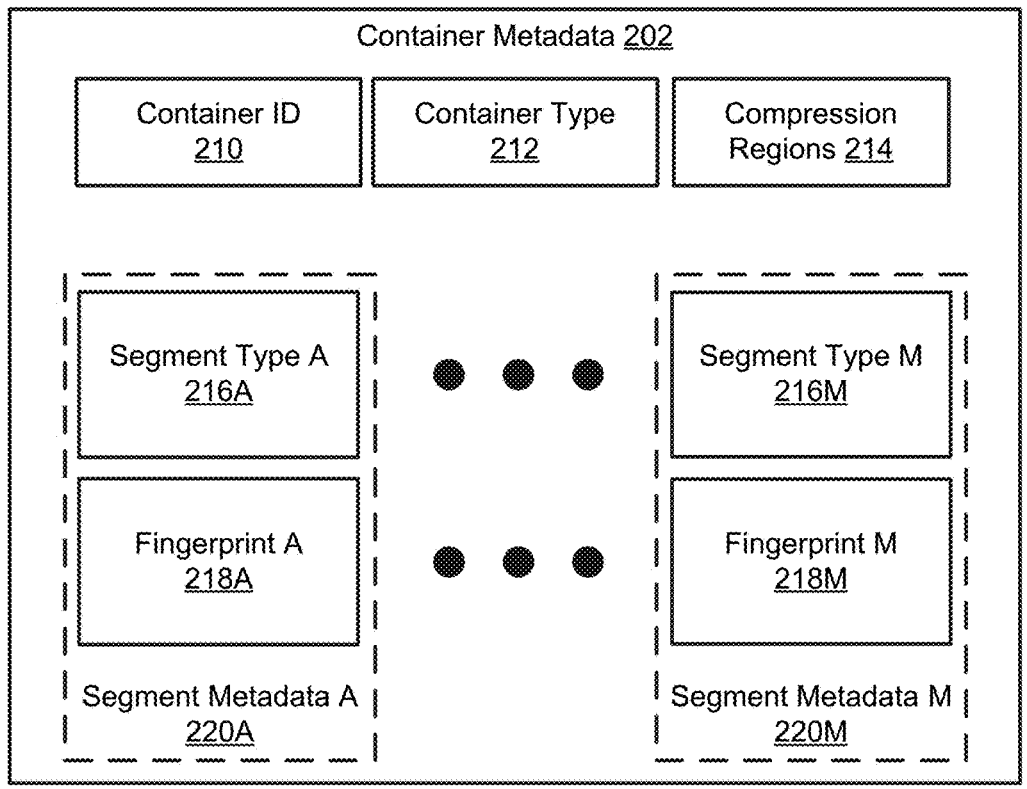
FIG. 2B shows a diagram of container metadata in accordance with one or more embodiments of the invention.
Figure 3A:
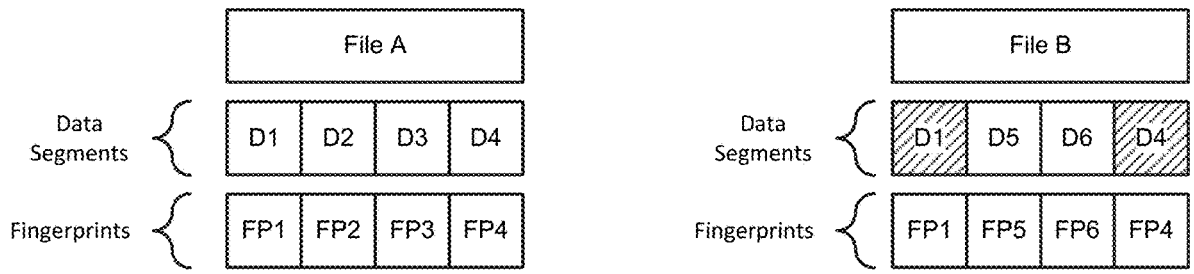
FIGS. 3A-3C show an example in accordance with one or more embodiments of the invention.
Figure 3B:
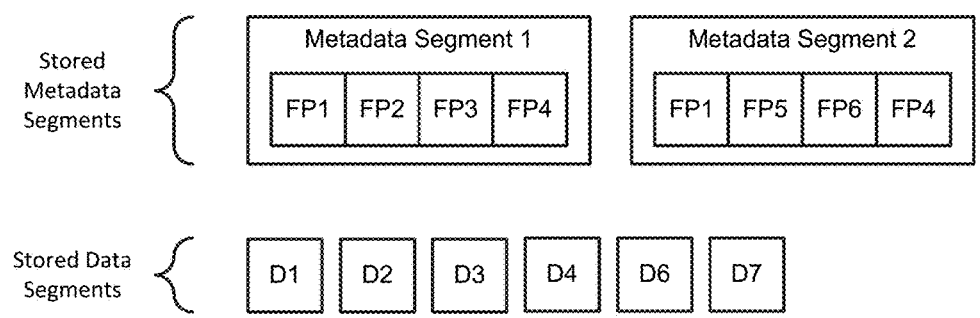
Figure 3C:
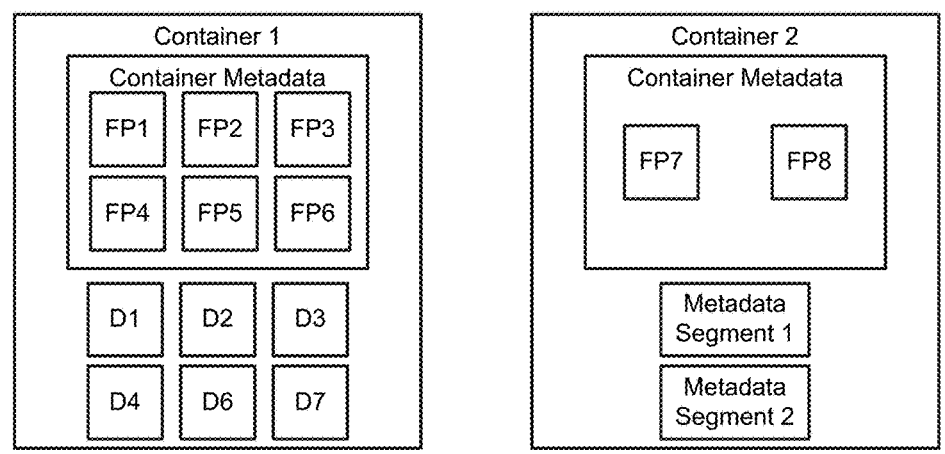

FIG. 2B shows a diagram of container metadata in accordance with one or more embodiments of the invention. The container metadata (202) may include one or more of the following: (i) a container identifier (ID) (210), which uniquely identifies the container in the persistent storage; (ii) container type (212), which specifies the types of segments the container includes, e.g., data segments or L1 and/or L2 and/or L3 etc. metadata segments; (iii) compression regions (214), which specifies which segments in the container are compressed; and (iv) segment metadata (220A, 220M), which includes a fingerprint (218A, 218M) (i.e., the fingerprint for the segment) and a segment type (216A, 216M) for each segment in the container. The segment type may specify whether the segment is a data segment (e.g., L0) or a metadata segment (e.g., LP). Further, the segment type may specify the specific metadata level (e.g., L1, L2, etc.).

Those skilled in the art will appreciate that the container metadata is not limited to the container metadata shown in FIG. 2B; rather, the container metadata may include additional and/or different information without departing from the invention.

FIGS. 3A-C show a non-limiting of example of how files may be stored in the persistent storage by the deduplication in accordance with one or more embodiments of the invention. Referring to FIGS. 2A-C, consider a scenario in which two files—File A and File B—are to be stored in the persistent storage (FIG. 1, 104). The files are obtained from one or more clients (FIG. 1, 100) by the deduplication system (FIG. 1, 102) and then processed by the deduplication service (106) for storage in the persistent storage (FIG. 1, 104).

As part of this processing, the deduplication service segments File A into data segments D1-D4 and calculates a fingerprint for each of the data segments (FP1-FP4). In this example, the deduplication service determines, using the fingerprints (FP1-FP4), that there are no duplicates of the data segments D1-D4 in the persistent storage. Based on this determination, data segments D1-D4 are stored in container 1 along with the corresponding fingerprints (FP1-FP4) (see FIG. 3C). In addition, a metadata segment, Metadata Segment 1, is generated by the deduplication service, where Metadata Segment 1 includes the fingerprints (FP1-FP4) for data segments (D1-D4) associated with File A. Metadata Segment 1 is subsequently stored in container 2 along with a fingerprint (FP7) for Metadata Segment 1.

File B is subsequently received by the deduplication service. The deduplication service segments File B into data segments D1, D5, D6, and D4 and calculates a fingerprint for each of the data segments (FP1, FP5, FP6, FP4). Using the aforementioned fingerprints and the fingerprints already calculated for data segments (D1-D4) associated with File A, a determination is made that D1 and D4 in File B are duplicates of D1 and D4, respectively, previously stored for File A. Based on this determination, only D5 and D6 are stored in container 1 along with their corresponding fingerprints (FP5, FP6).

A metadata segment, Metadata Segment 2, is then generated by the deduplication service, where Metadata Segment 2 includes the fingerprints (FP1, FP5, FP6, FP4) for data segments associated with File B. Metadata Segment 2 is subsequently stored in container 2 along with a fingerprint (FP8) for Metadata Segment 2.

Figure 4:
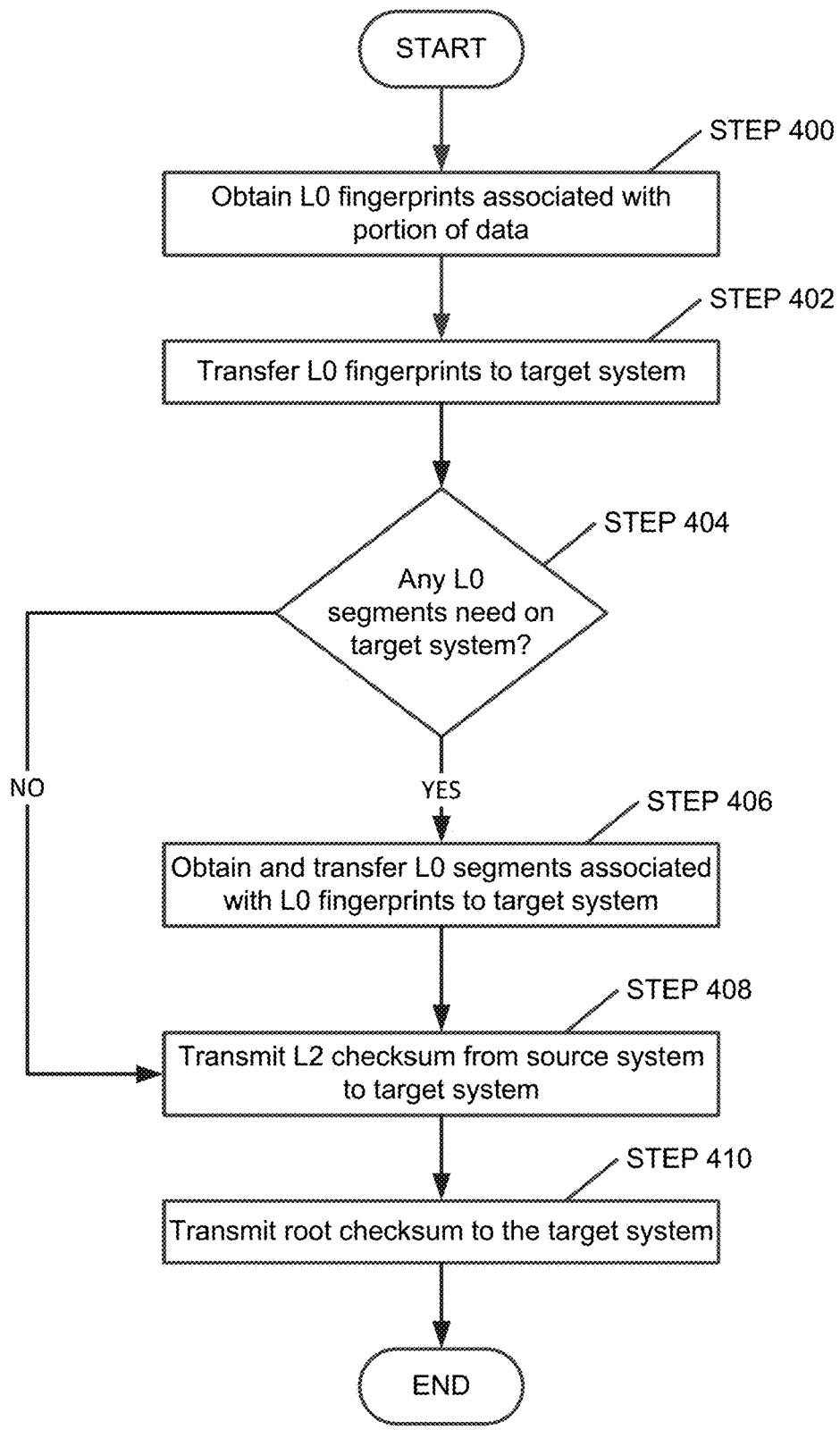
FIG. 4 shows a flowchart for transmitting data from a source system to a target system and verifying the integrity of the transmitted data in accordance with one or more embodiments of the invention.
Figure 5:
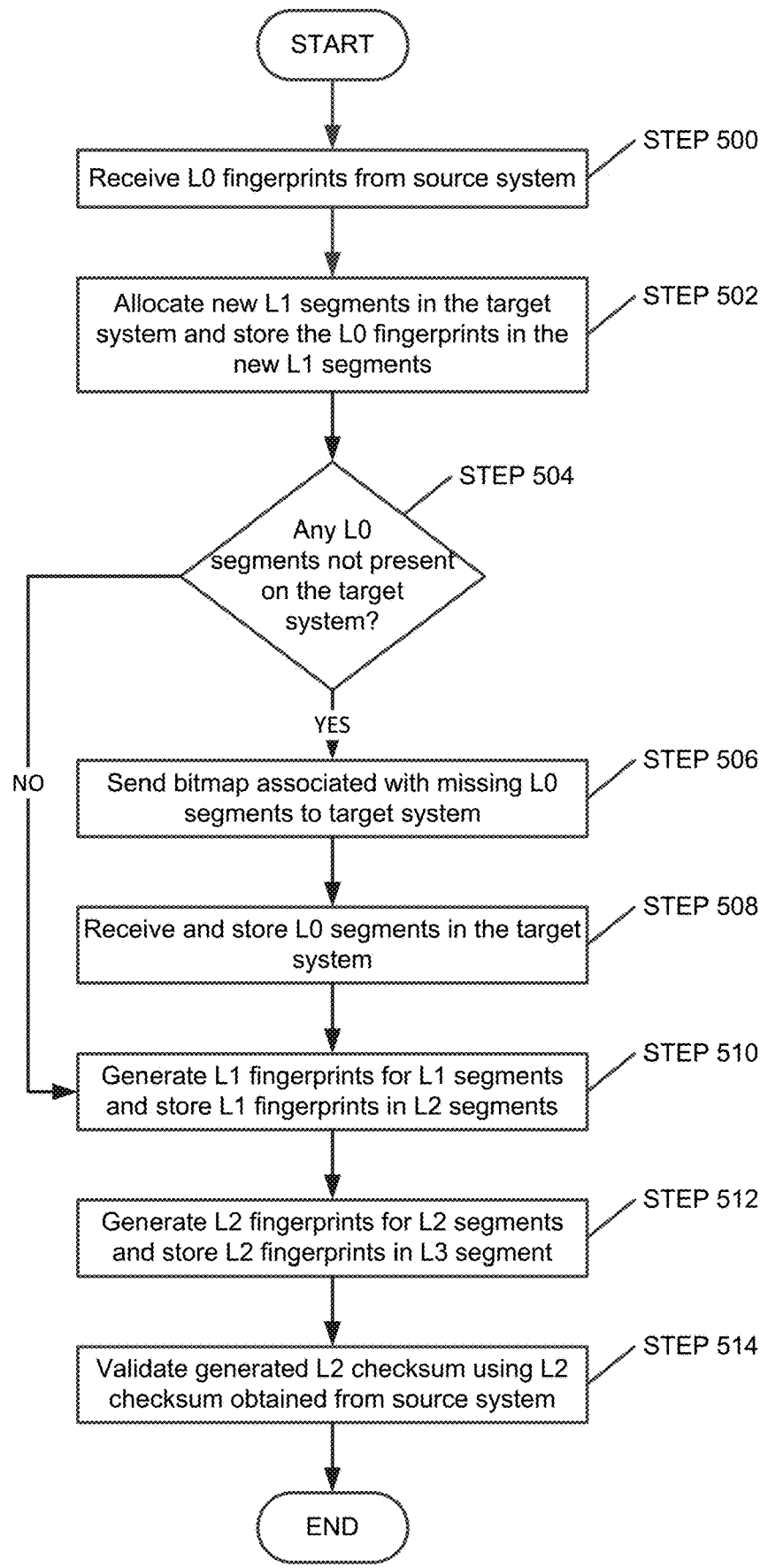
FIG. 5 shows a flowchart for receiving data from a source system by a target system and verifying the integrity of the transmitted data in accordance with one or more embodiments of the invention.
Figure 6:
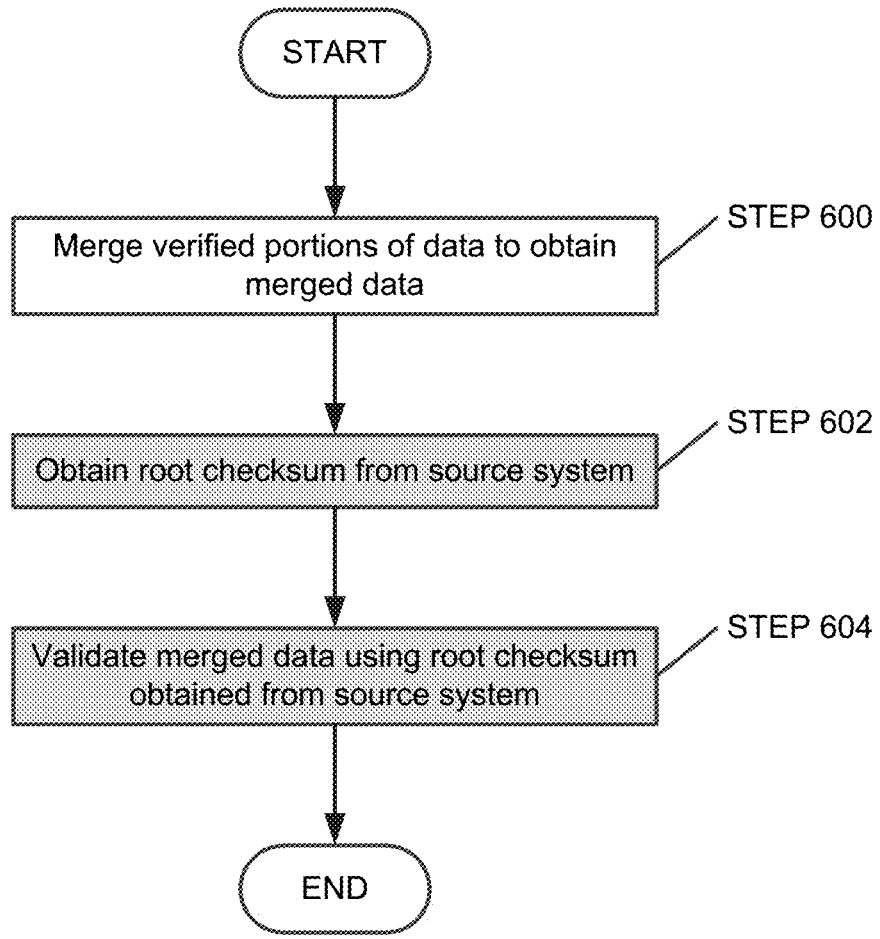
FIG. 6 shows a flowchart for combining portions of received data in accordance with one or more embodiments of the invention.

FIGS. 4-6 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

FIG. 4 shows a flowchart for transmitting data from a source system to a target system and verifying the integrity of the transmitted data in accordance with one or more embodiments of the invention. Steps 400-408 in the method shown in FIG. 4 may be performed independently, and in parallel, for each portion of the data to be transferred. The manner in which the data is divided into portions by the source system may vary based on the implementation on the invention. The method shown in FIG. 4 is performed by the source system.

Turning to FIG. 4, in step 400, L0 fingerprints associated with the portion of the data to be transferred are obtained.

In step 402, the L0 fingerprints are transferred to the target system.

In step 404, a determination is made about whether a bitmap has been received from the target system after the L0 fingerprints were sent in step 402. A bitmap (or other data structure) may be received in step 402 in scenarios in which one or more L0 segments associated with the transferred L0 fingerprints are not present in the target system. In such scenarios, the bitmap indicates which L0 segments need to be transferred from the source system to the target system. If a bitmap is received, the process proceeds to step 406; otherwise, the process proceeds to step 408.

In step 406, the L0 segments specified by the bitmap obtained from the persistent storage in the source system and transferred to the target system.

In step 408, one or more L2 checksums associated with the portion of the data that is being transferred to the target system are obtained and sent to the target system. The L2 checksum(s) is used to verify the integrity of the transmitted data on the target system (see e.g., FIG. 5, step 514). The timing of step 408 relative to step 406 may vary based on the implementation of the invention.

In step 410, at some later point in time, the root checksum is transmitted to the target system. Step 410 may be performed after the method shown in FIG. 5 is performed for each of the portions of data transmitted to the target system and after the individual portions of the data have been combined to obtain the merged data. If the data has been properly transmitted and combined on the target system, then the root checksum from the source system will match the root fingerprint for the data generated on the target system, which signifies that the data on the source system for properly transferred and stored on the target system.

FIG. 5 shows a flowchart for receiving data from a source system by a target system and verifying the integrity of the transmitted data in accordance with one or more embodiments of the invention. The method shown in FIG. 5 may be performed, in parallel, for each portion of the data that is transmitted from the source system. The method shown in FIG. 5 is performed by the target system.

In step 500, L0 fingerprints for a portion of the data are obtained from the source system.

In step 502, new L1 segments are allocated in the target system (e.g., in the persistent storage on the target system) and the received L0 fingerprints are stored in the newly allocated L1 segments.

In step 504, a determination is made about whether there are any L0 fingerprints in the newly allocated L1 segments, where the corresponding L0 segment is not present in the persistent storage in the target system. If there are missing L0 segments in the target system, then the process proceeds to step 506; otherwise, the process proceeds to step 510.

In step 506, a bitmap specifying the L0 for the missing L0 segments are sent to the source system.

In step 508, L0 segments identified using the bitmap sent in step 506 are received and stored in the target system. Those skilled in the art will appreciate the information about which L0 segments to transfer to the target system may be sent using data structures other than a bitmap without departing from the invention.

In step 510, the target system generates the L1 fingerprints using L1 segments (including the L0 fingerprints in the L1 segments). The generated L1 fingerprints are subsequently stored in the newly allocated L2 segments on the target system (e.g., in the persistent storage on the target system).

In step 512, the target system generates the L2 fingerprints using L2 segments (including the L1 fingerprints in the L2 segments). The generated L2 fingerprints are subsequently stored in the newly allocated L3 segments on the target system (e.g., in the persistent storage on the target system).

In step 514, the generated L2 checksum(s) (obtained from the generated L2 fingerprint(s)) is validated. More specifically, a corresponding L2 checksum(s) from the source system is obtained and compared to the L2 checksum(s) generated in step 512. If the L2 fingerprint(s) matches, the integrity of the portion of data is verified.

FIG. 6 shows a flowchart for combining portions of received data in accordance with one or more embodiments of the invention. The method shown in FIG. 6 is performed by the target system. The method shown in FIG. 6 may be performed after the individual portions of the data have been verified in accordance with FIG. 5.

In step 600, the portions of data (which have been verified) are combined to obtain merged data. In one embodiment of the invention, each of the portions of data may be presented as a logical tree (see e.g., FIG. 7F) and, in such cases, the merging of data includes merging the logical trees to obtain a merged tree (see e.g., FIG. 7G). The merging of the two logical trees may include generating additional LP segments and generating a root fingerprint (i.e., a fingerprint for the entire merged tree).

In step 602, a root checksum is obtained from the source system. In one embodiment of the invention, the root checksum corresponds to the fingerprint that covers all of the data being transferred. Said another way, the root checksum is the checksum that it located in the root of the logical tree (see e.g., FIG. 7A and FIG. 7G).

In step 604, the root checksum from the source system is compared with the root checksum generated on the target system. If the root checksum match, then the integrity of the data in the merged tree is verified.

FIG. 7A-7G shows an example in accordance with one or more embodiments of the invention. The example is not intended to limit the scope of the invention.

Figure 7A:
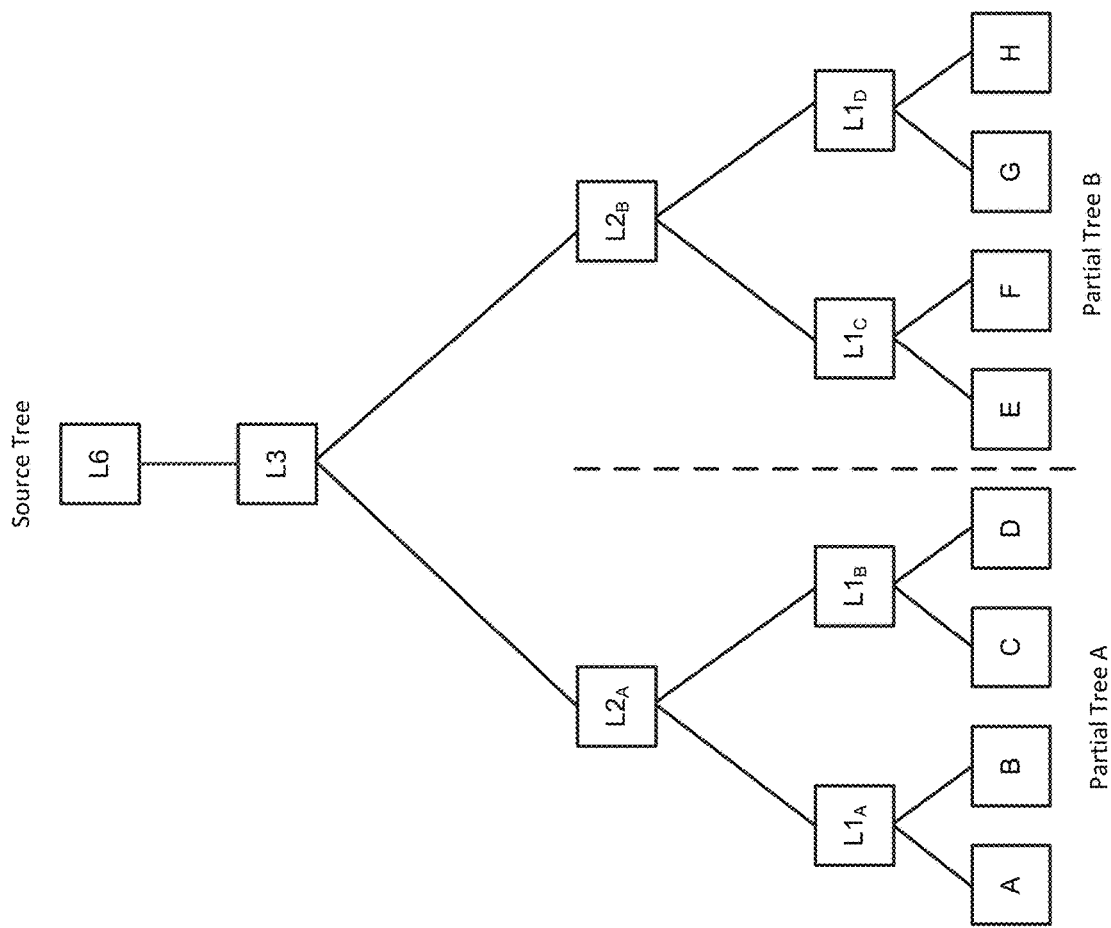
FIGS. 7A-7G show an example in accordance with one or more embodiments of the invention.

Turning to the example, consider a scenario in which the data shown in FIG. 7A is to be replicated to a target system. As shown in FIG. 7A, the data is stored as a set of segments, which are organized in a logical source tree. The segments denoted as A-H are L0 segments, the remainder of the segments are LP segments. More specifically, the LP segments include L1 segments: $L1_A$, $L1_B$, $L1_C$, and $L1_D$, L2 segments, $L2_A$ and $L2_B$, L3 segment (denoted as L3), and an L6 segment (denoted as L6). Each of the LP segments includes one or more fingerprints (not shown). Further, the L6 segment includes a root fingerprint (not shown). Additional detail about the contents of the fingerprints from each of the aforementioned LP segments is provided in FIGS. 7B-7E.

Figure 7B:
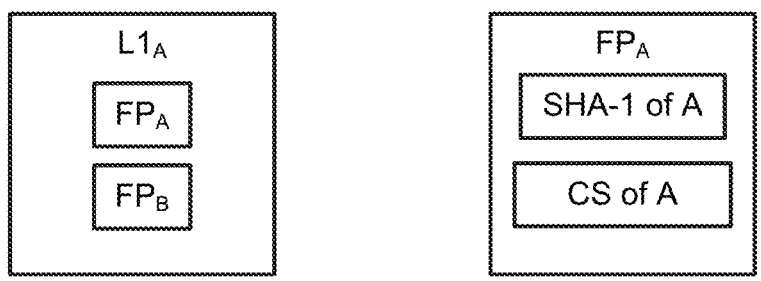

Referring to FIG. 7B, FIG. 7B shows the content of the $L1_A$ segment and the content of the fingerprint for segment A ($FP_A$). More specifically, the $L1_A$ segment includes a fingerprint for segment A (i.e., $FP_A$) and a fingerprint for segment B (i.e., $FP_B$). Further, as shown in FIG. 7B, $FP_A$ includes a SHA-1 of A (e.g., a hash value of segment A) and a checksum of segment A (denoted as CS of A). The other L1 segments may include similar content.

Figure 7C:
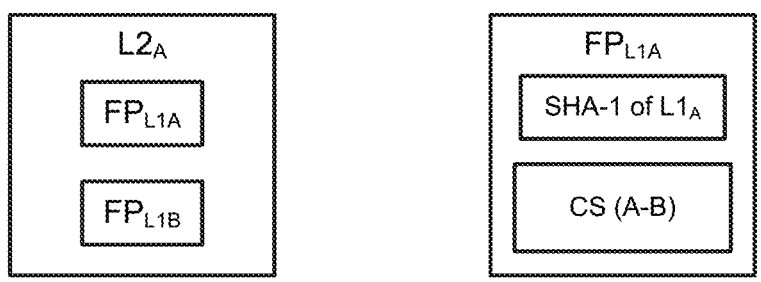

Referring to FIG. 7C, FIG. 7C shows the content of the $L2_A$ segment and the content of the fingerprint for segment $L1_A$ (i.e., $FP_{L1A}$). More specifically, the $L2_A$ segment includes a fingerprint for segment $L1_A$ (i.e., $FP_{L1A}$) and a fingerprint for segment $L1_B$ (i.e., $FP_{L1B}$). Further, as shown in FIG. 7C, $FP_{L1A}$ includes a SHA-1 of $L1_A$ (e.g., a hash value of segment $L1_A$) and a checksum value based on checksum values in all L0 segments referenced by $L1_A$ (denoted as CS (A-B)). The other L2 segments may include similar content.

Figure 7D:
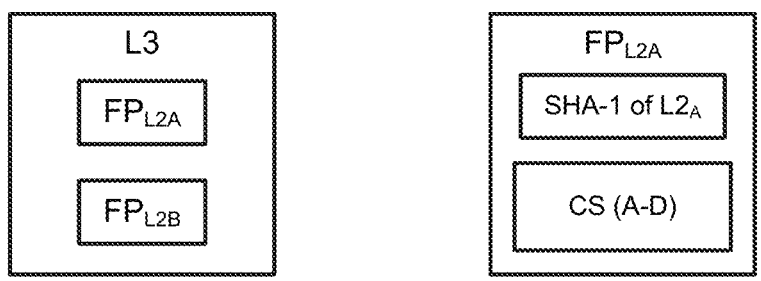

Referring to FIG. 7D, FIG. 7D shows the content of the L3 segment and the content of the fingerprint for segment $L2_A$ (i.e., $FP_{L2A}$). More specifically, the L3 segment includes a fingerprint for segment $L2_A$ (i.e., $FP_{L2A}$) and a fingerprint of segment $L2_B$ (i.e., $FP_{L2B}$). Further, as shown in FIG. 7D, $FP_{L2A}$ includes a SHA-1 of $L2_A$ (e.g., a hash value of segment $L2_A$) and a checksum value based on checksum values in all L1 segments referenced by $L2_A$ (denoted as CS (A-D)). The other L2 segments may include similar content.

Figure 7E:
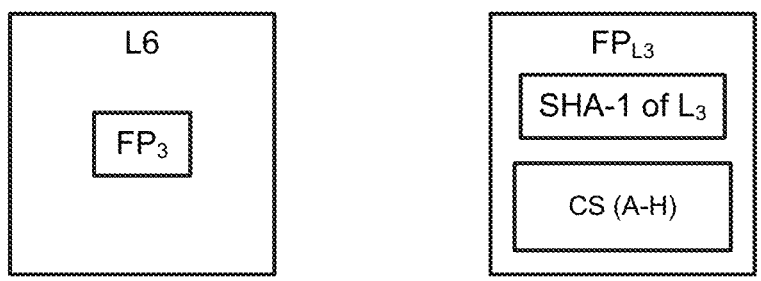

Referring to FIG. 7E, FIG. 7E shows the content of the L6 segment and the content of the fingerprint for segment L3 (i.e., $FP_{L3}$). Further, as shown in FIG. 7E, $FP_{L3}$ includes a SHA-1 of L3 (e.g., a hash value of segment L3) and a checksum value based on checksum values in all L2 segments referenced by L3 (denoted as CS (A-H)).

Continuing with the example and referring to FIG. 7A, the data is divided into two partial trees: partial tree A and partial tree B. The data associated with each of these partial trees may be transmitted in parallel. Said another way, the data associated with partial tree A may be transmitted in parallel to the data associated with partial tree B. The data for both portions of the source tree may be transmitted in accordance with the method shown in FIG. 4 and processed by the target system in accordance with FIG. 5.

Figure 7F:
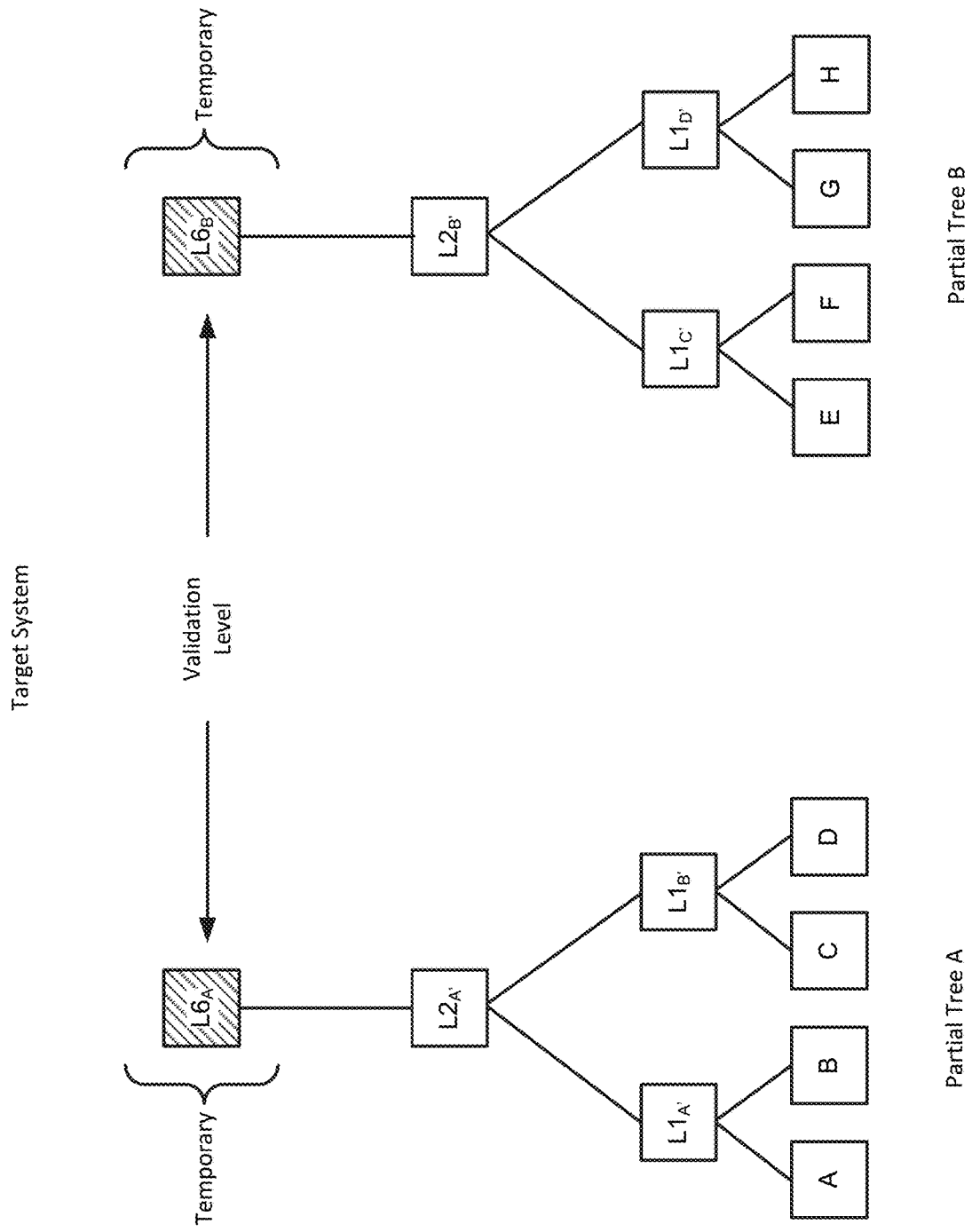

Referring to FIG. 7F, FIG. 7F shows the state of each of the partial trees after steps 400-408 in FIG. 4 and steps 500-514 in FIG. 5 have been performed. In this example, the L1 segments (i.e., $L1_A'$, $L1_B'$, $L1_C'$, and $L1_D'$) include the L0 fingerprints received from the source system. However, the L2 segments (i.e., $L2_A'$, $L2_B'$), including the L1 fingerprints, are generated on the target system. Further, a temporary L6 segments (i.e., $L6_A$, $L6_B$) are generated on the target system, where the L6 segments include the L2 fingerprints (i.e., L6$_A$ includes FP$_{L2A}$, and L6$_B$ includes FP$_{L2B}$). Once the temporary L6 segments are generated, step 514 is performed on each of the L6 segments. Specifically, L2 checksums are obtained from the L3 segments (see e.g., FIG. 7A) on the source system and compared to the generated L2 checksums in the temporary L6 segments. The comparison, which is performed on a per-partial tree basis, is used to verify the integrity of the partial trees.

In this example, assume that the integrity of the partial trees is verified.

Accordingly, the target system performs the method shown in FIG. 6 to combine the two partial trees to obtain a merged tree (or merged data).

Figure 7G:
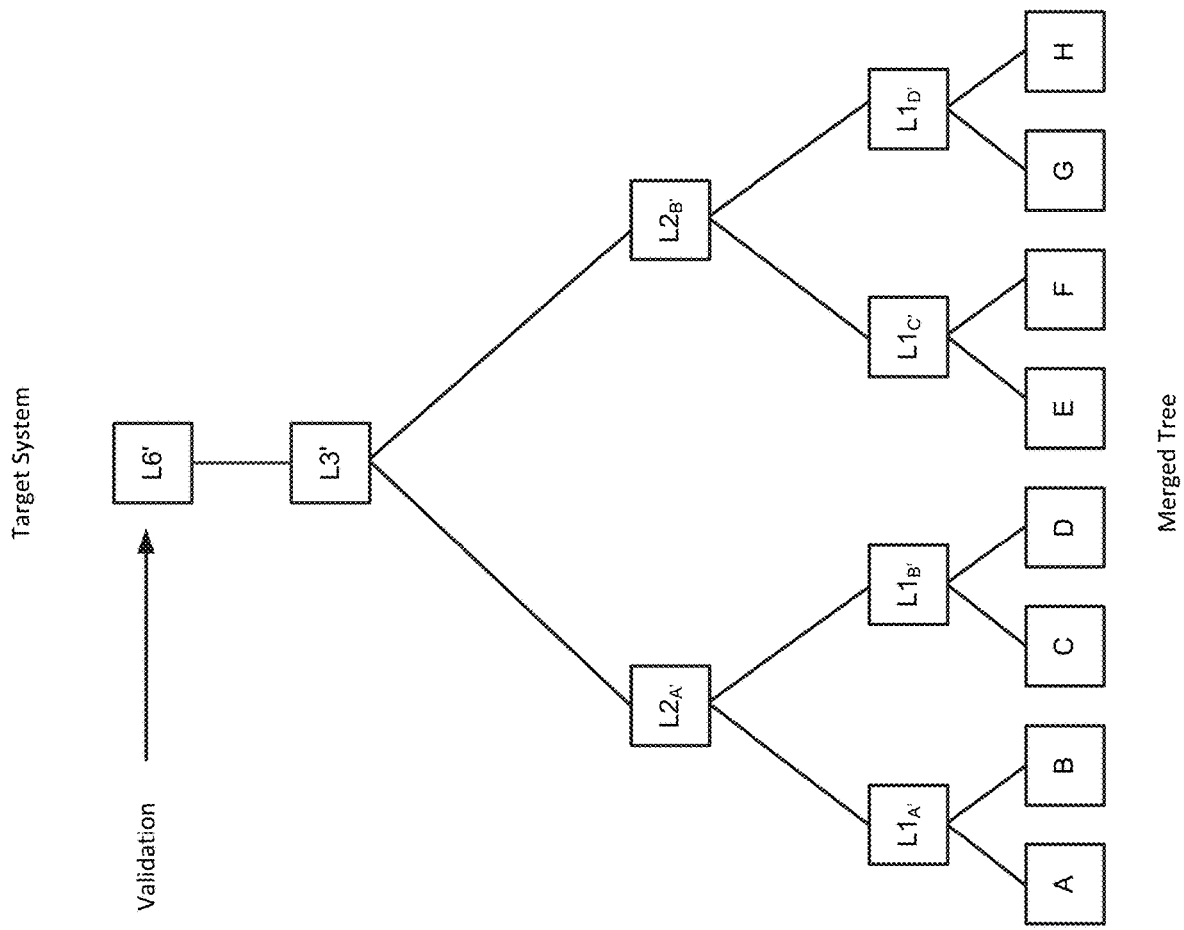

Referring to FIG. 7G, FIG. 7G shows the result of merging the two partial trees. In this example, the merging process results in the generation of an L3 segment and a new L6 segment (L6') (i.e., an L6 segment that is different from the temporary L6 segments). The checksum in the L6 segment (which may be referred to as the root checksum) is compared to the corresponding root checksum obtained from the source system. If the root checksums match, then the data has been successfully replicated on the target system.

Those skilled in the art will appreciated that while the invention has been described with respect to the logical tree structure shown in FIG. 7A-7G, the invention may be implemented using a logical tree structure of any depth. Further, while the logical trees shown in FIGS. 7A-7G are balanced trees, the invention is not limited to balanced trees.

One or more embodiments of the invention may be implemented using instructions executed by one or more processors in the deduplication system. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for replicating data, the method comprising:
   obtaining L0 fingerprints for a first portion of data;
   storing the L0 fingerprints for the first portion of the data in a first set of L1 segments in persistent storage on a target system;
   generating, by the target system, a first set of L1 fingerprints using the L1 segments;
   storing the first set of L1 fingerprints in a first set of L2 segments in the persistent storage;
   generating a first set of L2 fingerprints using the first set of L1 segments, wherein each L2 fingerprint in the first set of L2 fingerprints comprises a hash component and a checksum component;
   storing the first set of L2 fingerprints in a first set of L3 segments in the persistent storage;
   verifying, by the target system, the integrity of the first set of L2 segments using the first set of L2 fingerprints;
   based on the verifying, merging the first portion of the data with a second portion of the data to obtain merged data on the target system, wherein the second portion of the data is verified independently from the first portion of the data; and
   verifying the integrity of the merged data,
   obtaining L0 fingerprints for the second portion of data;
   storing the L0 fingerprints for the second portion for the data in a second set of L1 segments in the persistent storage;
   generating, by the target system, a second set of L1 fingerprints using the second set of L1 segments;
   storing the second set of L1 fingerprints in a second set of L2 segments in the persistent storage;
   generating a second set of L2 fingerprints using the second set of L2 segments;
   storing the second set of L2 fingerprints in a second set of L3 segments in the persistent storage;
   wherein the verifying second portion of the data comprises verifying, by the target system, the integrity of the second set of L2 segments using the second set of L2 fingerprints, and
   wherein obtaining the L0 fingerprints for the first portion of data is performed in parallel with obtaining the L0 fingerprints for the second portion of data,
   wherein at least one file of the data to be replicated comprises the merged data and a third portion of data.

2. The method of claim 1, further comprising:
   determining, using the first set of L0 fingerprints, that a L0 segment corresponding to a L0 fingerprint in the first set of L0 fingerprints is not present on the target system;
   in response to the determining, requesting the L0 segment from the source system;
   in response to the sending, receiving the L0 segment from the source system and storing the L0 segment in the persistent storage.

3. The method of claim 1, wherein the hash component comprises a hash value generated using a L2 segment in the first set of L2 segments and the checksum component comprises a checksum value generating using checksum values of all L1 segments referenced by the L2 segment.

4. The method of claim 1, wherein verifying the integrity of the first portion of the data comprises obtaining at least a L2 checksum from a source system and comparing the obtained L2 checksum with at least one L2 checksum in the first set of L2 fingerprints.

5. The method of claim 1, wherein verifying the integrity of the merged data comprises obtaining at least a root checksum from a source system and comparing the obtained root checksum with a root checksum of the merged data.

6. A non-transitory computer readable medium comprising computer readable program code, which when executed by a computer processor enables the computer processor to perform a method for replicating data, the method comprising:
   obtaining L0 fingerprints for a first portion of data;
   storing the L0 fingerprints for the first portion of the data in a first set of L1 segments in persistent storage on a target system;
   generating, by the target system, a first set of L1 fingerprints using the L1 segments;
   storing the first set of L1 fingerprints in a first set of L2 segments in the persistent storage;
   generating a first set of L2 fingerprints using the first set of L1 segments, wherein each L2 fingerprint in the first set of L2 fingerprints comprises a hash component and a checksum component;
   storing the first set of L2 fingerprints in a first set of L3 segments in the persistent storage;
   verifying, by the target system, the integrity of the first set of L2 segments using the first set of L2 fingerprints;

based on the verifying, merging the first portion of the data with a second portion of the data to obtain merged data on the target system, wherein the second portion of the data is verified independently from the first portion of the data; and verifying the integrity of the merged data, obtaining L0 fingerprints for the second portion of data;

storing the L0 fingerprints for the second portion for the data in a second set of L1 segments in the persistent storage;

generating, by the target system, a second set of L1 fingerprints using second set of L1 segments;

storing the second set of L1 fingerprints in a second set of L2 segments in the persistent storage;

generating a second set of L2 fingerprints using the second set of L2 segments;

storing the second set of L2 fingerprints in a second set of L3 segments in the persistent storage;

wherein the verifying second portion of the data comprises verifying, by the target system, the integrity of the second set of L2 segments using the second set of L2 fingerprints, wherein obtaining the L0 fingerprints for the first portion of data is performed in parallel with obtaining the L0 fingerprints for the second portion of data, wherein at least one file of the data to be replicated comprises the merged data and a third portion of data.

7. The non-transitory computer readable medium of claim 6, the method further comprising:

determining, using the first set of L0 fingerprints, that a L0 segment corresponding to a L0 fingerprint in the first set of L0 fingerprints is not present on the target system;

in response to the determining, requesting the L0 segment from the source system;

in response to the sending, receiving the L0 segment from the source system and storing the L0 segment in the persistent storage.

8. The non-transitory computer readable medium of claim 6, wherein the hash component comprises a hash value generated using a L2 segment in the first set of L2 segments and the checksum component comprises a checksum value generating using checksum values of all L1 segments referenced by the L2 segment.

9. The non-transitory computer readable medium of claim 6, wherein verifying the integrity of the first portion of the data comprises obtaining at least a L2 checksum from a source system and comparing the obtained L2 checksum with at least one L2 fingerprint in the first set of L2 fingerprints.

10. The non-transitory computer readable medium of claim 6, wherein verifying the integrity of the merged data comprises obtaining at least a root checksum from a source system and comparing the obtained root checksum with a root fingerprint of the merged data.

11. A system, comprising:

a source system comprising a processor and memory, wherein the memory comprises instructions, which when executed by the processor, perform a method, the method comprising data to:

sending L0 fingerprints for the first portion of data to a target system, and sending at least one L2 checksum associated with the first portion of the data to the target system; and the target system, operatively connected to the source system, comprising a second processor and a second memory, wherein the memory comprises instructions, which when executed by the second processor, perform a second method, the second method:

obtaining the L0 fingerprints for the first portion of data;

storing the L0 fingerprints for the first portion of the data in a first set of L1 segments in persistent storage on the target system;

generating a first set of L1 fingerprints using the L1 segments;

storing the first set of L1 fingerprints in a first set of L2 segments in the persistent storage;

generating a first set of L2 fingerprints using the first set of L1 segments, wherein each L2 fingerprint in the first set of L2 fingerprints comprises a hash component and a checksum component;

verifying the integrity of the first set of L2 segments using the at least one L2 checksum associated with the first portion of the data;

based on the verifying, merging the first portion of the data with the second portion of the data to obtain merged data, wherein the second portion of the data is verified independently from the first portion of the data; and verifying the integrity of the merged data, wherein method performed by the source system further comprises:

sending L0 fingerprints for the second portion of the data to the target system, and sending at least one L2 checksum associated with the second portion of the data to the target system; and wherein the second method performed by the target system further comprises:

obtaining L0 fingerprints for the second portion of data;

storing the L0 fingerprints for the second portion for the data in a second set of L1 segments in the persistent storage;

generating a second set of L1 fingerprints using the L1 segments;

storing the second set of L1 fingerprints in a second set of L2 segments in the persistent storage;

generating a second set of L2 fingerprints using the second set of L2 segments;

wherein the verifying second portion of the data comprises verifying the integrity of the second set of L2 segments using the at least one L2 checksum associated with the second portion of the data, wherein the L0 fingerprints for the first portion of data are send in parallel with the L0 fingerprints for the second portion of data, wherein at least one file of the data to be replicated comprises the merged data and a third portion of data.

12. The system of claim 11, wherein the hash component comprises a hash value generated using a L2 segment in the first set of L2 segments and the checksum component comprises a checksum value generating using checksum values of all L1 segments referenced by the L2 segment.

* * * * *